US009957971B2

(12) United States Patent
Hu et al.

(10) Patent No.: US 9,957,971 B2
(45) Date of Patent: May 1, 2018

(54) METHOD FOR PREVENTING A FAN FROM BURNING DOWN AT ACTIVATION

(71) Applicant: ASIA VITAL COMPONENTS CO., LTD., New Taipei (TW)

(72) Inventors: Qing-Wu Hu, New Taipei (TW); Dong-Qi Tian, New Taipei (TW); Bao-Lin Yao, New Taipei (TW)

(73) Assignee: ASIA VITAL COMPONENTS CO., LTD., New Tapei (TW)

( * ) Notice: Subject to any disclaimer, the term of this patent is extended or adjusted under 35 U.S.C. 154(b) by 568 days.

(21) Appl. No.: 14/698,802

(22) Filed: Apr. 28, 2015

(65) Prior Publication Data
US 2016/0319827 A1 Nov. 3, 2016

(51) Int. Cl.
F04D 27/00 (2006.01)
(52) U.S. Cl.
CPC ......... *F04D 27/008* (2013.01); *F04D 27/004* (2013.01); *F05D 2260/85* (2013.01)

(58) Field of Classification Search
CPC ... F04D 27/008; F04D 27/004; F05D 2260/85
See application file for complete search history.

*Primary Examiner* — Richard Edgar
*Assistant Examiner* — Michael Sehn
(74) *Attorney, Agent, or Firm* — Jackson IPG PLLC; Demian K. Jackson

(57) ABSTRACT

A method for preventing a fan from burning down includes steps of: using a central processing unit (CPU) to detect rotational speed of forward operation of a fan and defining as a highest backward rotational speed value; using the CPU to detect operation direction and rotational speed of backward operation of the fan; and using the CPU to activate the fan to operate forward or activate a rotation stop control signal to stop the fan when the fan impeller rotates forward or backward by return air, if the rotational speed of the rotation stop control signal is smaller or larger than the highest backward rotational speed value, the CPU activating the fan to operate forward or making the fan to generate a warning signal and keeping providing the rotation stop control signal. The method can prevent the fan from burning down and enhance the stability.

9 Claims, 2 Drawing Sheets

METHOD FOR PREVENTING A FAN FROM BURNING DOWN AT ACTIVATION

BACKGROUND OF THE INVENTION

1. Field of the Invention

The present invention relates generally to a method for activating a fan to operate, and more particularly to a method for preventing a fan from burning down when activated to operate forward and enhancing the stability of forward operation of the fan.

2. Description of the Related Art

Along with the advance of sciences and technologies, the reliance of peoples on various electronic apparatuses has been more and more increased. In order to meet the requirements of lightweight, convenience and utility, in the current market, there is a trend to design lightweight, thin, miniaturized, multifunctional and high-processing-speed electronic products (such as computers and notebooks) as the mainstream of the electronic apparatuses. Such products can more satisfy the daily requirements in modern society.

In a power-off state, the fan impeller of a cooling fan is generally in a still state. However, when the fan impeller of the cooling fan is blown and moved backward by external return air, the fan impeller of the cooling fan will rotate backward. When the cooling fan is to be powered on to operate forward, in the case it is detected that the fan impeller rotates backward, the fan impeller will be first braked to stop backward rotating or slow down the backward rotational speed. The brake rotational speed provided by the cooling fan is increased with the increase of the return air volume. The higher the brake rotational speed is, the greater the load on the cooling fan is. When the cooling fan is powered on to operate forward, the turn-on forward voltage is likely to exceed the operational rotational speed specification due to oversized brake rotational speed. This will lead to burnout of the cooling fan or affect the stability of the operation of the cooling fan.

It is therefore tried by the applicant to provide a method for preventing a fan from burning down when activated to operate forward to solve the above problem.

SUMMARY OF THE INVENTION

It is therefore a primary object of the present invention to provide a method for preventing a fan from burning down when activated to operate forward and enhancing the stability of forward operation of the fan.

It is a further object of the present invention to provide the above method for preventing the fan from burning down when activated to operate forward. In this method, the fan will actively provide a warning signal when burnout of the fan possibly happens at activation.

To achieve the above and other objects, the method for preventing a fan from burning down at activation of the present invention includes steps of: using a central processing unit to detect rotational speed of forward operation of a fan impeller of the fan and defining the rotational speed as a highest backward rotational speed value; using the central processing unit to detect operation direction of the fan impeller of the fan and rotational speed of backward operation of the fan impeller; using the central processing unit to activate the fan impeller to operate forward when the fan impeller is blown and moved by return air to rotate forward; and using the central processing unit to activate a rotation stop control signal to stop the fan impeller when the fan impeller is blown and moved by the return air to rotate backward, if the rotational speed of the rotation stop control signal is smaller than the highest backward rotational speed value, the central processing unit activating the fan to operate forward, if the rotational speed of the rotation stop control signal is larger than the highest backward rotational speed value, the central processing unit making the fan generate a warning signal and keeping providing the rotation stop control signal. The method can prevent the fan from burning down when operating forward and enhance the stability of forward operation of the fan.

By means of the method of the present invention, the fan is prevented from burning down when activated to forward operate and the stability of forward operation of the fan is enhanced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
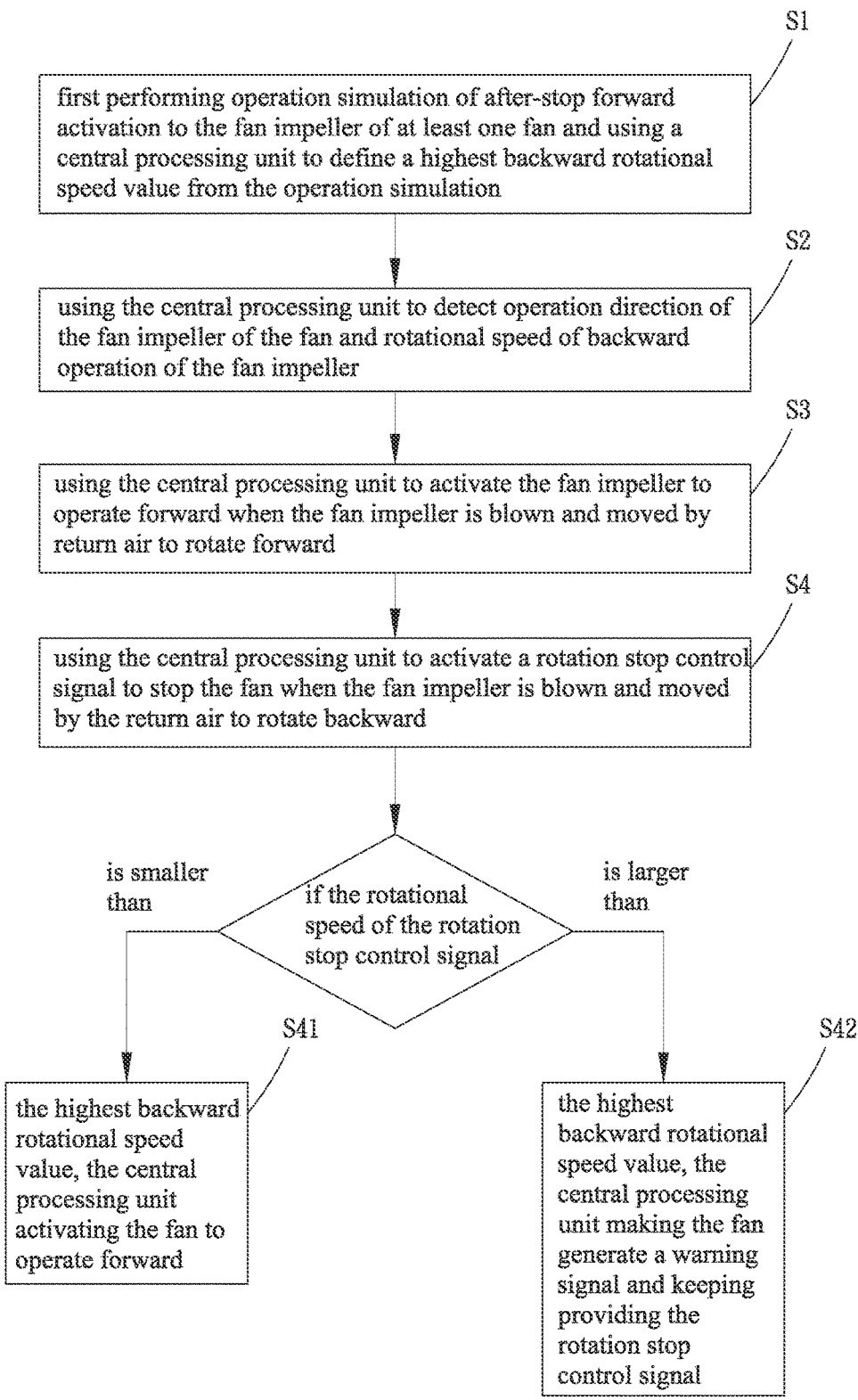
FIG. 1 is a flow chart of a preferred embodiment of the present invention.
Figure 2:
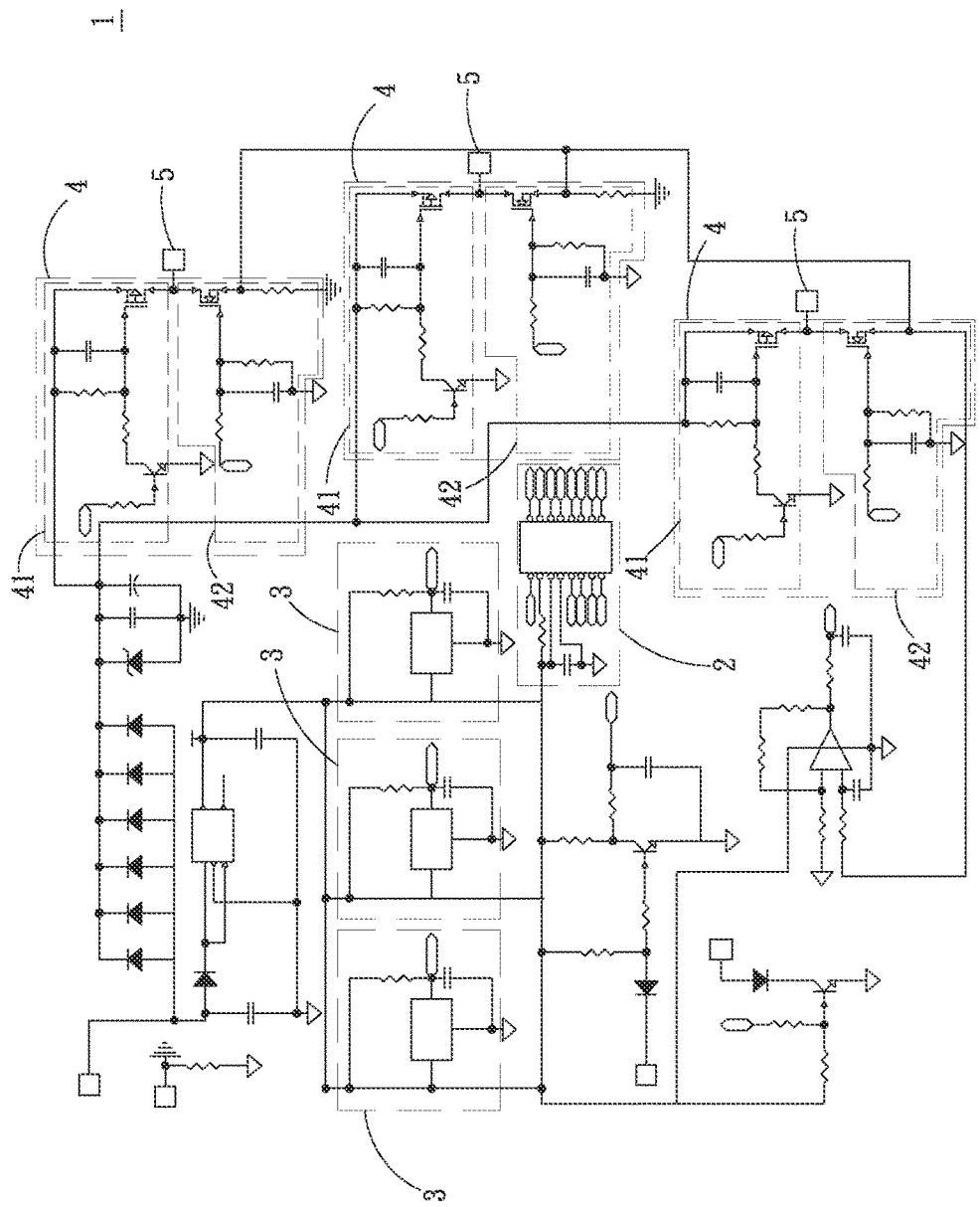
FIG. 2 is a circuit diagram of the preferred embodiment of the present invention.

Please refer to FIGS. 1 and 2. FIG. 1 is a flow chart of a preferred embodiment of the present invention. FIG. 2 is a circuit diagram of the preferred embodiment of the present invention. As shown in the drawings, the method for preventing a fan from burning down at activation of the present invention includes steps of:

S1. using a central processing unit 2 to detect the rotational speed of the forward operation of the fan impeller and defining the rotational speed as a highest backward rotational speed value, the fan mainly having a fan circuit board 1, the central processing unit 2 being mainly disposed on the fan circuit board 1, in addition, at least one Hall sensor 3, at least one transistor unit 4 and at least one coil 5 being disposed on the fan circuit board 1, the fan being a single-phase fan or a three-phase fan, in this embodiment, the fan being a three-phase fan for illustration purposes, the central processing unit 2 being a microcontroller or a motor drive IC, the transistor unit 4 including an upper bridge transistor 41 and a lower bridge transistor 42, in forward operation of the fan, the central processing unit 2 detecting the upper limit value of the rotational speed of the forward operation of the fan and defining the rotational speed as a highest backward rotational speed value, the highest backward rotational speed value being the upper limit value of the rotational speed of the forward operation of the fan impeller;

S2. using the central processing unit 2 to detect the operation direction of the fan impeller of the fan and the rotational speed of the backward operation of the fan impeller, before the fan is powered on the operate forward, from the signal of the Hall sensor 3, the central processing unit 2 judging the operation direction of the fan impeller and detecting the rotational speed according to the operation direction, when the fan is blown and moved by return air, the fan impeller operating backward and the central processing unit 2 detecting that the fan impeller operates backward and detecting the rotational speed of the backward operation of the fan impeller according to the backward operation of the fan impeller;

S3. using the central processing unit 2 to activate the fan to operate forward when the fan impeller is blown and moved by the return air to rotate forward, the central processing unit 2 detecting the operation direction of the fan impeller of the fan, when the central processing unit 2 detects that the fan is blown and moved by the return air to rotate forward, the central processing unit 2 turning on the upper bridge transistor 41 to activate the fan to operate forward;

S4. using the central processing unit 2 to activate a rotation stop control signal to stop the fan when the fan impeller is blown and moved by the return air to rotate backward, the central processing unit 2 detecting the operation direction of the fan impeller of the fan, when the central processing unit 2 detects that the fan is blown and moved by the return air to rotate backward, the central processing unit 2 first activating a rotation stop control signal to stop the fan from rotating backward before turning on the upper bridge transistor 41;

S41. using the central processing unit 2 to activate the fan to operate forward if the rotational speed of the rotation stop control signal is smaller than the highest backward rotational speed value, if the central processing unit 2 detects that the rotational speed of the rotation stop control signal is smaller than the highest backward rotational speed value, the central processing unit 2 turning on the upper bridge transistor 41 to activate the fan to operate forward; and S42. using the central processing unit 2 to make the fan generate a warning signal and keep providing the rotation stop control signal if the rotational speed of the rotation stop control signal is larger than the highest backward rotational speed value, if the central processing unit 2 detects that the rotational speed of the rotation stop control signal is larger than the highest backward rotational speed value, the central processing unit 2 cutting off the upper bridge transistor 41 and turning on the lower bridge transistor 42 to stop the fan impeller from rotating and the central processing unit 2 making the fan generate a warning signal and keeping providing the rotation stop control signal not to activate the fan to operate forward and the central processing unit 2 continuously comparing the rotational speed of the rotation stop control signal with the highest backward rotational speed value.

According to the above, by means of the method for preventing a fan from burning down at activation of the present invention, it is detected whether the fan rotates forward or backward. If the fan rotates forward, the fan is activated to operate forward. If the fan rotates backward, it is first judged whether the rotational speed of the rotation stop control signal is larger or smaller than the highest backward rotational speed value so as to further control the fan to operate forward or generate a warning signal. This can prevent the fan from burning down at activation and enhance the stability of forward operation of the fan.

The present invention has been described with the above embodiments thereof and it is understood that many changes and modifications in the above embodiments can be carried out without departing from the scope and the spirit of the invention that is intended to be limited only by the appended claims.

What is claimed is:

1. A method for preventing a fan from burning down at activation, comprising steps of:

using a central processing unit to detect rotational speed of forward operation of a fan impeller of the fan and defining the rotational speed as a highest backward rotational speed value;

using the central processing unit to detect operation direction of the fan impeller of the fan and rotational speed of backward operation of the fan impeller;

using the central processing unit to activate the fan impeller to operate forward when the fan impeller is blown and moved by return air to rotate forward; and using the central processing unit to activate a rotation stop control signal to stop the fan impeller when the fan impeller is blown and moved by the return air to rotate backward, if the rotational speed of the rotation stop control signal is smaller than the highest backward rotational speed value, the central processing unit activating the fan to operate forward, if the rotational speed of the rotation stop control signal is larger than the highest backward rotational speed value, the central processing unit making the fan generate a warning signal and keeping providing the rotation stop control signal.

2. The method for preventing the fan from burning down at activation as claimed in claim 1, wherein when the central processing unit makes the fan generate the warning signal and keeps providing the rotation stop control signal, the central processing unit continuously compares the rotational speed of the rotation stop control signal with the highest backward rotational speed value.

3. The method for preventing the fan from burning down at activation as claimed in claim 1, wherein the central processing unit is a microcontroller or a motor drive IC.

4. The method for preventing the fan from burning down at activation as claimed in claim 1, wherein an upper limit value of the rotational speed of the forward operation of the fan impeller is defined as the highest backward rotational speed value.

5. The method for preventing the fan from burning down at activation as claimed in claim 1, wherein the central processing unit is disposed on a fan circuit board and at least one Hall sensor, at least one transistor unit and at least one coil are additionally disposed on the fan circuit board.

6. The method for preventing the fan from burning down at activation as claimed in claim 5, wherein the central processing unit judges whether the fan impeller rotates forward or backward according to the signal of the Hall sensor.

7. The method for preventing the fan from burning down at activation as claimed in claim 6, wherein the transistor unit includes an upper bridge transistor and a lower bridge transistor and the central processing unit turns on the upper bridge transistor to make the fan impeller operate forward.

8. The method for preventing the fan from burning down at activation as claimed in claim 7, wherein the central processing unit cuts off the upper bridge transistor and turns on the lower bridge transistor to stop the fan impeller from rotating.

9. The method for preventing the fan from burning down at activation as claimed in claim 8, wherein when the rotational speed of the rotation stop control signal is larger than the highest backward rotational speed value, the central processing unit makes the fan generate a warning signal and keeps providing the rotation stop control signal so as not to activate the fan to operate forward.

* * * * *